United States Patent
Thomas

(10) Patent No.: US 9,081,660 B2
(45) Date of Patent: Jul. 14, 2015

(54) METHOD AND SYSTEM FOR EFFICIENTLY SWAPPING PIECES INTO AND OUT OF DRAM

(75) Inventor: Nicholas James Thomas, Dundee (GB)

(73) Assignee: SanDisk Technologies Inc., Plano, TX (US)

( * ) Notice: Subject to any disclaimer, the term of this patent is extended or adjusted under 35 U.S.C. 154(b) by 684 days.

(21) Appl. No.: 13/206,274

(22) Filed: Aug. 9, 2011

(65) Prior Publication Data

US 2013/0042050 A1  Feb. 14, 2013

(51) Int. Cl.
| | |
|---|---|
| G06F 12/00 | (2006.01) |
| G06F 12/02 | (2006.01) |
| G06F 13/00 | (2006.01) |
| G06F 13/28 | (2006.01) |
| G06F 12/12 | (2006.01) |
| G06F 12/10 | (2006.01) |

(52) U.S. Cl.
CPC ........ G06F 12/0246 (2013.01); *G06F 12/1009* (2013.01); *G06F 12/121* (2013.01); *G06F 2212/7201* (2013.01)

(58) Field of Classification Search
CPC .... G06F 12/1009; G06F 12/12; G06F 12/121
USPC ................. 711/206, 133, 202, 103, 104, 165
See application file for complete search history.

(56) References Cited

U.S. PATENT DOCUMENTS

| | | | |
|---|---|---|---|
| 6,000,006 A | 12/1999 | Bruce et al. | |
| 6,901,505 B2 | 5/2005 | McGrath | |
| 7,117,309 B2* | 10/2006 | Bearden | 711/137 |
| 7,383,391 B2* | 6/2008 | Davis et al. | 711/137 |
| 7,743,233 B2 | 6/2010 | Wang et al. | |
| 7,873,792 B2* | 1/2011 | Anand et al. | 711/137 |
| 2007/0214325 A1* | 9/2007 | Sasamoto | 711/137 |
| 2010/0115204 A1* | 5/2010 | Li et al. | 711/130 |
| 2010/0174823 A1* | 7/2010 | Huang | 709/230 |

* cited by examiner

*Primary Examiner* — Mark Giardino, Jr.
(74) *Attorney, Agent, or Firm* — Brinks Gilson & Lione

(57) ABSTRACT

A system and method for managing swaps of pieces of an address mapping table is disclosed. The method may include a controller of a storage device receiving a stream of requests for accesses to the mapping table, analyzing the stream of requests to determine at least one characteristic of the stream of requests, and determining whether to copy a piece of the mapping table stored in non-volatile memory into the volatile memory based on the determined at least one characteristic. The system may include a storage device with a controller configured to perform the method noted above.

20 Claims, 6 Drawing Sheets

METHOD AND SYSTEM FOR EFFICIENTLY SWAPPING PIECES INTO AND OUT OF DRAM

TECHNICAL FIELD

This application relates generally to a method and system for managing the storage of data in a data storage device. More specifically, this application relates to efficiently swapping pieces into and out of a volatile memory, such as DRAM.

BACKGROUND

Non-volatile memory systems, such as flash memory, are used in digital computing systems as a means to store data and have been widely adopted for use in consumer products. Flash memory may be found in different forms, for example in the form of a portable memory card that can be carried between host devices or as a solid state disk (SSD) embedded in a host device. In SSDs or other similar storage devices, a fine granularity mapping table is used to enable best write performance. The mapping table can typically be very large. The full table or subparts of it are used to perform read and write tasks. It is therefore desirable to store a working copy in dynamic random access memory (DRAM) to ease random read and write overhead.

However, it may not be economic or technologically viable to use a DRAM sufficiently large to hold the entire mapping table. If the entire mapping table is not held in DRAM, the mapping table is broken down into pieces, with only some (but not all) of the pieces stored in DRAM. In particular, non-volatile memory (such as flash memory) may store all "M" pieces of the mapping table, and DRAM may store a working copy of "N" pieces of the mapping table, where N<M.

Previous solutions have attempted to select which of the pieces should be held in DRAM. One solution is to disallow any swapping of pieces between DRAM and flash memory. In this solution, the N pieces are stored in DRAM and are not swapped regardless of the reads or writes to memory. Another solution is to swap pieces constantly. In this solution, if a piece of the mapping table is necessary for access and not included in the DRAM, the piece is copied to DRAM. Still another solution is a swapping scheme based on counting of hits over a period of time and comparing the hits to a threshold. Each of these solutions suffers from inefficiently managing the pieces of the mapping table in DRAM.

BRIEF SUMMARY

In order to address the problems and challenges noted above, a system and method for managing swaps of pieces of an address mapping table is disclosed.

According to a first aspect, a method for managing which pieces of a mapping table to store in a volatile memory of a storage device is disclosed. The method includes a processor receiving a stream of requests for accesses to the mapping table, analyzing the stream of requests to determine at least one characteristic of the stream of requests, and determining whether to copy a piece of the mapping table stored in non-volatile memory into the volatile memory based on the determined at least one characteristic. Examples of a stream of requests includes a read stream indicative of instructions to read from the storage device, a write stream indicative of instructions to write to the storage device, and an internal stream indicative of instructions to copy within the storage device. In one embodiment, the method analyzes the stream of requests to determine whether the stream is random (e.g., the stream randomly accesses the address mapping table). Moreover, a determination of randomness of the stream affects the determination whether to swap pieces of the mapping table between non-volatile memory and volatile memory.

In another aspect, a storage device is disclosed. The storage device may include a non-volatile memory, a volatile memory, and a controller in communication with the non-volatile memory and the volatile memory. The controller may be configured to receive a stream of requests for accesses to the mapping table, analyze the stream of requests to determine at least one characteristic of the stream of requests, and determine whether to copy a piece of the mapping table stored in non-volatile memory into the volatile memory based on the determined at least one characteristic.

DETAILED DESCRIPTION

Figure 1:
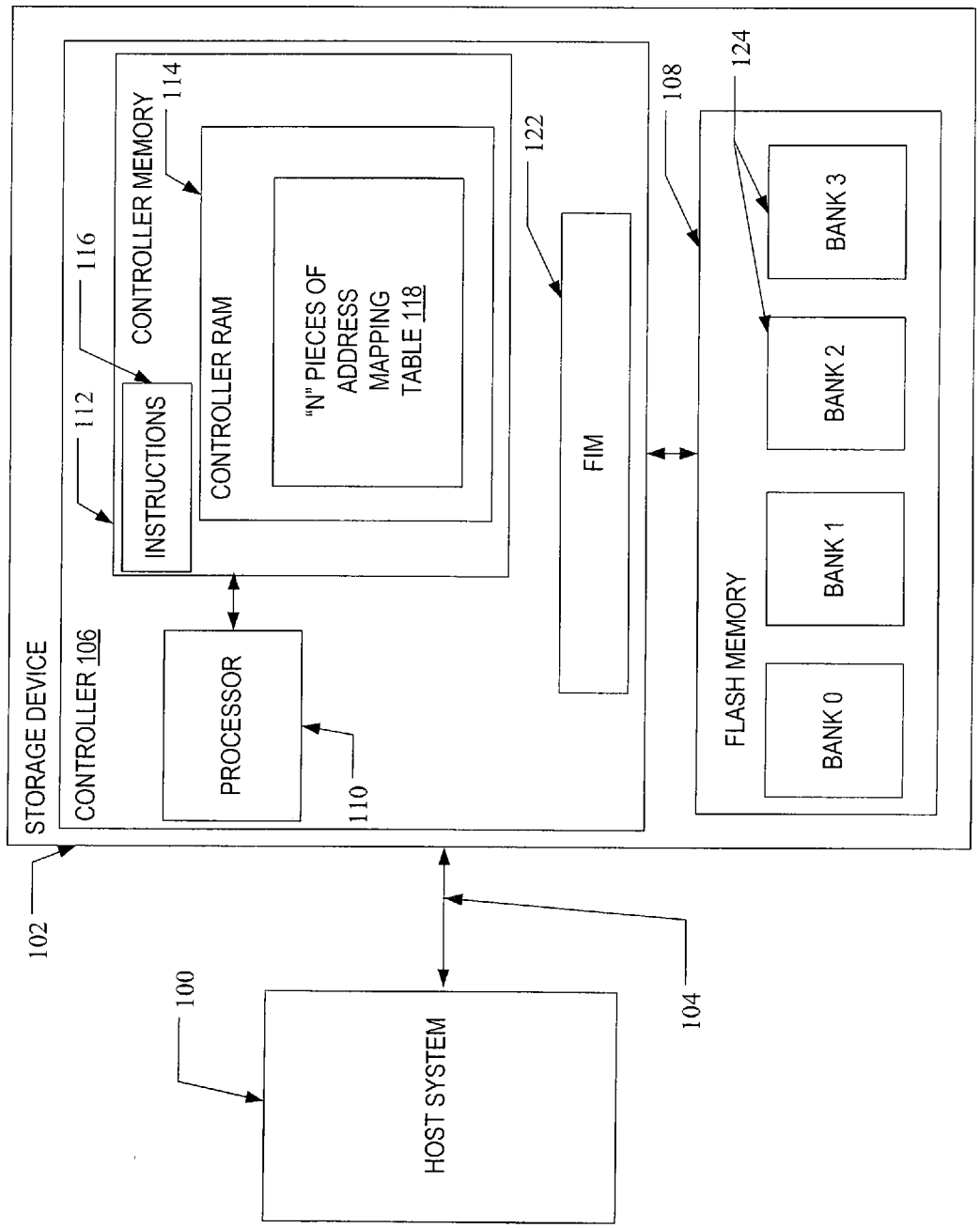
FIG. 1 illustrates a block diagram of a storage device and host according to one embodiment.

A flash memory system suitable for use in implementing aspects of the invention is shown in FIG. 1. A host system 100 stores data into, and retrieves data from, a storage device 12. The storage device 102 may be embedded in the host system 100 or may exist in the form of a card or other removable drive, such as a solid state disk (SSD) that is removably connected to the host system 100 through a mechanical and electrical connector. The host system 100 may be any of a number of fixed or portable data generating devices, such as a personal computer, a mobile telephone, a personal digital assistant (PDA), or the like. The host system 100 communicates with the storage device over a communication channel 104.

The storage device 102 contains a controller 106 and a memory 108. As shown in FIG. 1, the controller 106 includes a processor 110 and a controller memory 112. The processor 110 may comprise a microprocessor, a microcontroller, an application specific integrated circuit (ASIC), a field programmable gate array, a logical digital circuit, or other now known or later developed logical processing capability. The controller memory 112 may include volatile memory such as random access memory (RAM) 114 and/or non-volatile memory, and processor executable instructions 116 for handling memory management. For example, the RAM in the controller memory may be a DRAM.

As discussed in more detail below, the storage device 102 may include functions for memory management. In operation, the processor 110 may execute memory management instructions (which may be resident in instructions 116) for operation of the memory management functions. For example, the processor executable instructions for implementing the flow diagrams in FIGS. 4-6B may be stored in 116, as discussed in more detail below. The memory management functions may control the assignment of the one or more portions of the memory within storage device 102, such as controller memory 112. For example, memory management functions may allocate a portion of controller memory 112 for a data cache. One, some, or all of the memory management functions may be performed by one or separate elements within the storage device 102. The controller RAM 114 may include one or more pieces of an address mapping table 118, as explained in greater detail below. The controller 106 may also include one of more flash interface modules (FIMs) 122 for communicating between the controller 106 and the flash memory 108.

The flash memory 108 is non-volatile memory and may consist of one or more memory types. These memory types may include, without limitation, memory having a single level cell (SLC) type of flash configuration and multi-level cell (MLC) type flash memory configuration. The flash memory 108 may be divided into multiple banks 124. The storage device may be arranged to have a different FIM designated for each bank, or more than one bank associated with a FIM. Each bank 124 may include one or more physical die, and each die may have more than one plane.

Figure 2:
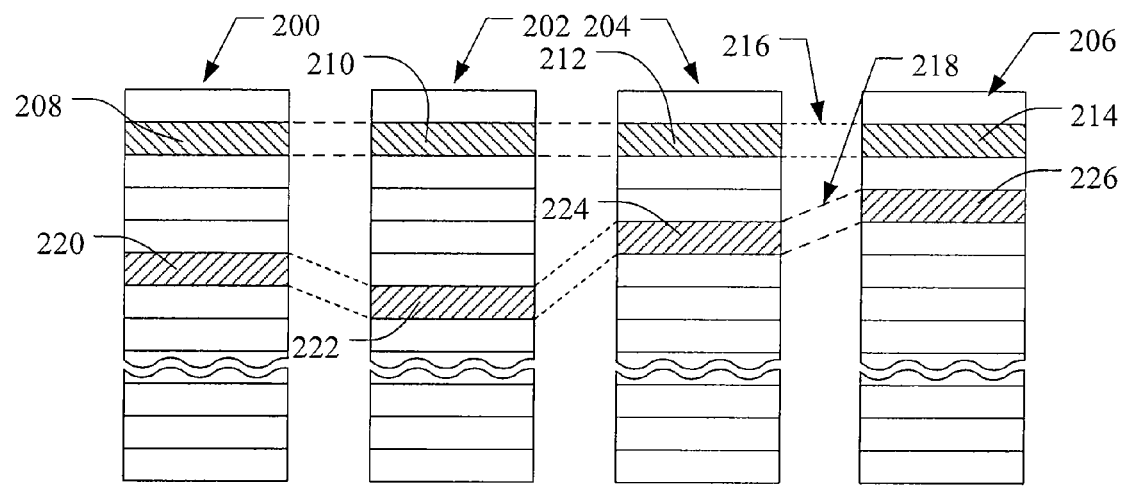
FIG. 2 illustrates an example physical memory organization of a memory bank of FIG. 1.

Each bank 124 of the flash memory 108 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 2, a conceptual illustration of a bank 124 of a representative flash memory cell array is shown. Four planes or sub-arrays 200, 202, 204 and 206 of memory cells may be on a single integrated memory cell chip (also referred to as a die), on two chips (two of the planes on each chip) or on four separate chips. The specific arrangement is not important to the discussion below and other numbers of planes may exist in a system. The planes are individually divided into blocks of memory cells shown in FIG. 2 by rectangles, such as blocks 208, 210, 212 and 214, located in respective planes 200, 202, 204 and 206. There may be dozens or hundreds of blocks in each plane. Blocks may be logically linked together to form a metablock that may be erased as a single unit. For example, blocks 208, 210, 212 and 214 may form a first metablock 216. The blocks used to form a metablock need not be restricted to the same relative locations within their respective planes, as is shown in the second metablock 218 made up of blocks 220, 222, 224 and 226.

Figure 3:
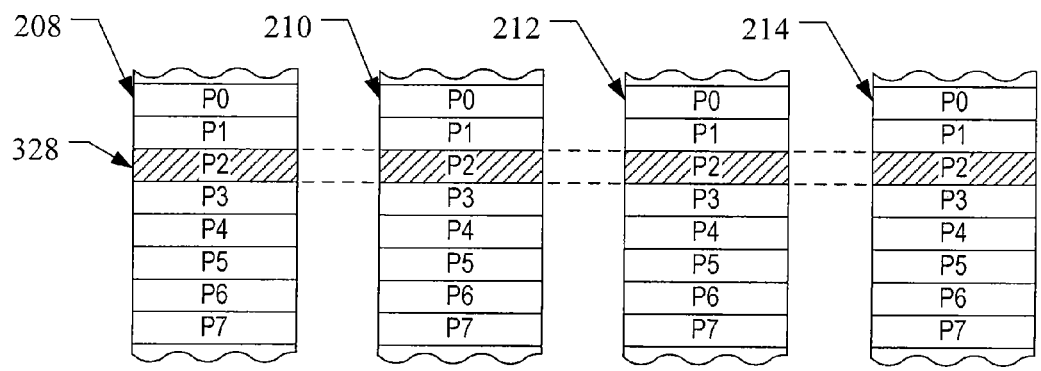
FIG. 3 shows an expanded view of a portion of the physical memory of FIG. 2.

The individual blocks are in turn divided for operational purposes into pages of memory cells, as illustrated in FIG. 3. The memory cells of each of blocks 208, 210, 212, and 214, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 328 is illustrated in FIG. 3 as formed of one physical page for each of the four blocks 208, 210, 212 and 214. The metapage 328 includes the page P2 in each of the four blocks but the pages of a metapage need not necessarily have the same relative position within each of the blocks. A metapage is the maximum unit of programming. The blocks disclosed in FIGS. 2-3 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host 100. The LBAs are then mapped to one or more physical blocks in the storage device 102 where the data is physically stored using the address mapping table.

A flash memory system, such as storage device 102, typically uses one or more tables to manage reads to, writes from, or internal copies within the flash memory. One example table is the address mapping table, which may convert between one address (such as a logical block address (LBA)) to another address (such as a physical address). The address mapping table is typically large, and is therefore broken down into separate pieces, such as M pieces. The address mapping table may be stored in the flash memory (such as flash memory 108), and a part of the address mapping table (such as N pieces of the address mapping table in 118, where N<M) may be stored in volatile memory, such as Dynamic Random Access Memory (DRAM).

The storage device 102 accesses at least a part of one of the pieces (a sub-piece) of the address mapping table when responding to a request for information. For example, a request may relate to a sub-piece of one of the pieces of the address mapping table, or may relate to multiple sub-pieces of multiple pieces of the address mapping table (in boundary conditions). There is a cost involved, in terms of processing, in accessing a piece, and a lower cost involved in accessing a sub-piece. However, should successive requests access the same piece, there is less cost in accessing the piece once and storing it in DRAM, than in accessing several sub-pieces.

The address mapping table may be divided into M pieces. The size of the pieces (as well as the number of pieces) for dividing the address mapping table may be determined by such factors as the size of the index required (e.g., one entry per piece) and the typical access size. Further, the sub-piece may be of a size that is unmanageable to store in DRAM due to one or more factors (such as index size, etc.). So that, the division of the address mapping table for purposes of determining which parts are stored in DRAM is at the piece level, which is determined to be manageable, rather than at the sub-piece level, which may be unmanageable. The address mapping table is merely one example of a data construct that can be subdivided into pieces, and can be swapped in and out of RAM.

As discussed in more detail with respect to FIGS. 4-6B, a system and method is disclosed for determining when pieces are to be swapped in and out of DRAM, and when sub-pieces are to be read. For example, a system and method is disclosed for determining whether to move address mapping information for the data storage device (such as a piece of the address mapping table) from a main store (such as flash memory) to a cache store with limited size (such as DRAM) according to the probability of the address mapping information being subsequently accessed, where the probability is determined based on a preceding sequence of address mapping requests.

Figure 4:
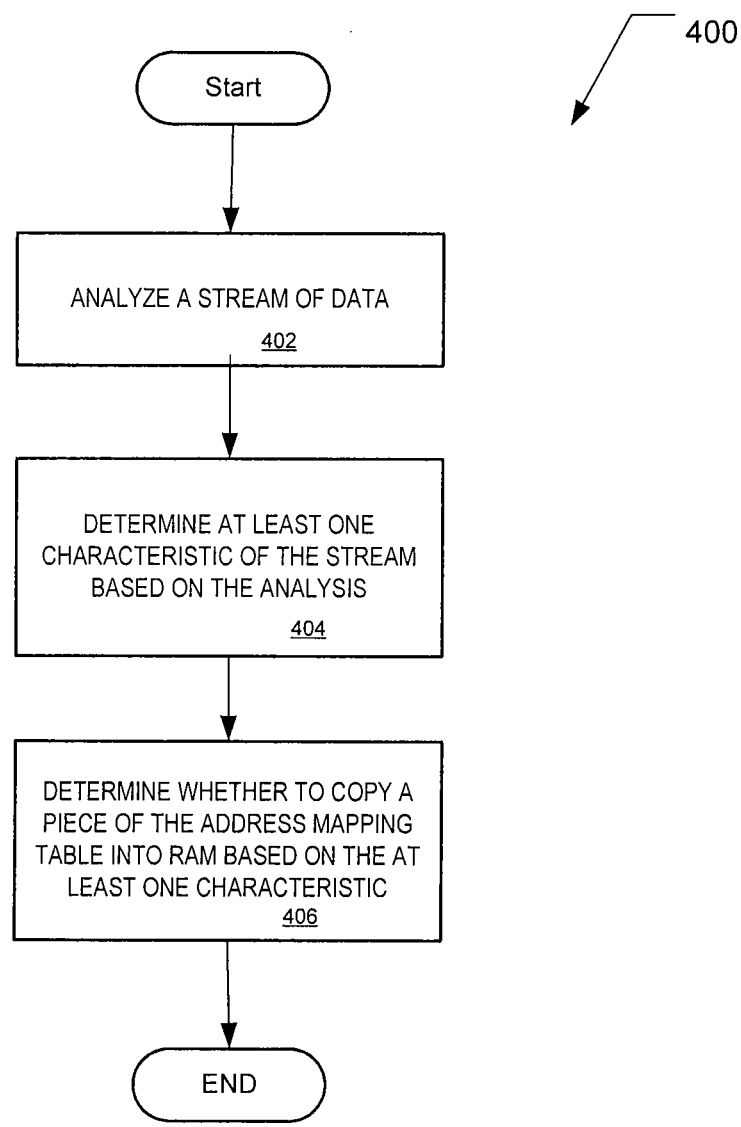
FIG. 4 is a flow chart of a method of analyzing a stream in order to determine a characteristic of the stream.

FIG. 4 is a flow chart 400 of a method of analyzing a stream in order to determine a characteristic of the stream. A flow of data (termed a stream) may be examined or analysed, as shown at 402. Examples of different streams include a read stream, a write stream, and an internal stream. A read stream is indicative of host instructions from host system 100 to read from the storage device, with the read stream accessing the address mapping table to execute reads. A write stream is indicative of host instructions from host system 100 to write to the storage device, with the write stream accessing the address mapping table to execute writes. An internal stream is indicative of instructions to copy within the storage device for internal movement of data within the storage device. An example of an internal stream is garbage collection, which may comprise internal copying of remaining valid data from a previously written block to a new block so that the previously written block may be recycled for later use.

At 404, at least one characteristic of the data stream may be determined based on the analysis. A stream may have one or more characteristics that may assist in determining whether to swap pieces of the address mapping table from DRAM. One example characteristic is randomness, discussed in more detail below. Further, different streams may have different characteristics (such as a read stream may have a random characteristic whereas a write stream may have a non-random characteristic), so that the determined characteristic may be particular to the stream analyzed.

At 406, it is determined whether to copy a piece of the address mapping table from non-volatile memory into RAM based on the determined characteristic. For example, whether the stream is random or non-random affects the decision whether to copy a piece of the address mapping table into RAM. If the analysis of the stream indicates that it is random, swapping pieces may not affect whether a piece stored in RAM will be more likely to be accessed by subsequent requests in the stream. In other words, if the requests in the stream are random (and there is no discernible pattern to the requests), the pieces not stored in RAM may be no more likely to be accessed by future requests than the pieces already stored in RAM. Therefore, there is no real need to undergo the effort to swap pieces of the address mapping table into RAM. So that, the randomness determination may disallow (or make it less likely to) swap pieces of the address mapping table into RAM.

Figure 5:
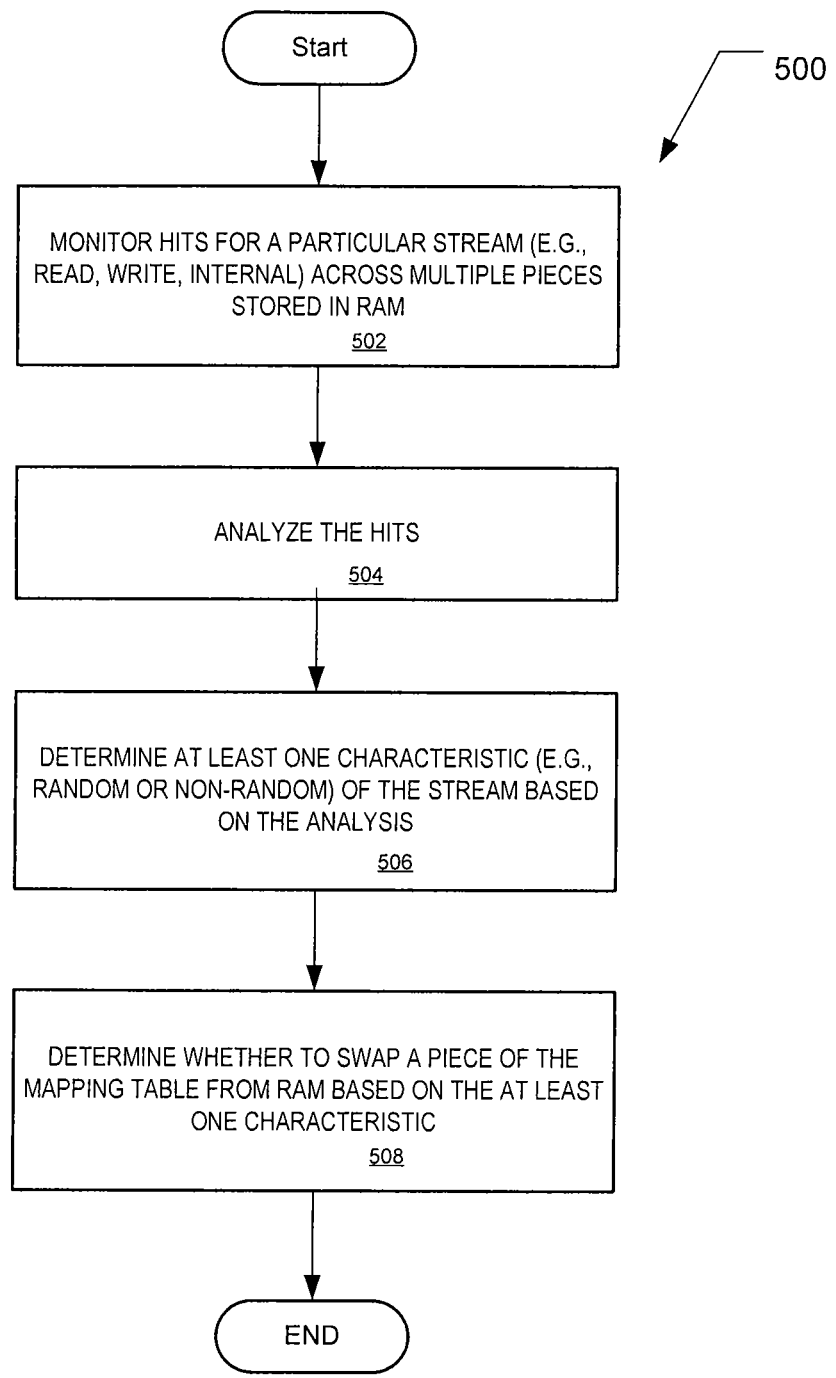
FIG. 5 is a flow chart of a method of analyzing a stream in order to determine randomness of the stream.

FIG. 5 is a flow chart 500 of a method of analyzing a stream in order to determine randomness of the stream. At 502, the hits for a particular stream (e.g., read, write, internal) are monitored across multiple pieces of the address mapping table stored in RAM. A "hit" is when a request uses one of the pieces stored in RAM (i.e., the requested piece if the address mapping table is stored in RAM). In one embodiment, more than one piece of the address mapping table stored in RAM is monitored for hits. For example, in a RAM that stores N pieces of the address table, the hits are monitored across all of the N pieces, so that using any one of the N pieces is considered a hit. This is unlike monitoring individual pieces of the N pieces separately for hits.

At 504, the hits are analyzed. As discussed above, the hits are monitored across a group of the pieces stored in the RAM. In the case where the hits are monitored across all N pieces in RAM, the hits characterize the stream as a whole. Thus, analysis of the hits may be used to determine at least one characteristic of the stream, as shown at block 506. One characteristic is whether the stream is considered random or non-random. At 508, it is determined whether to swap a piece of the mapping table from RAM based on the determined characteristic.

Figure 6A:
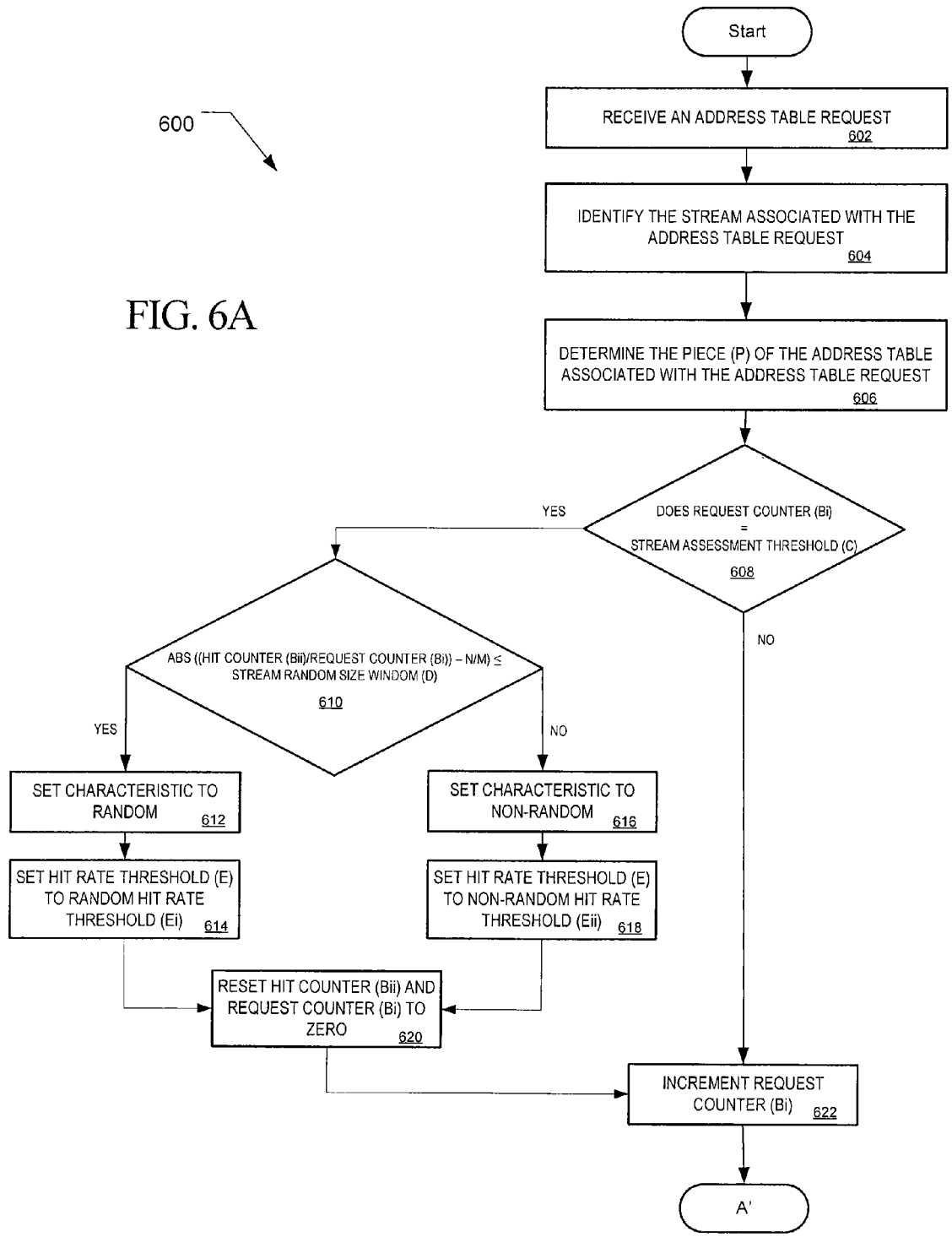
FIG. 6 is a more detailed flow chart of the method disclosed in FIG. 5.
Figure 6B:
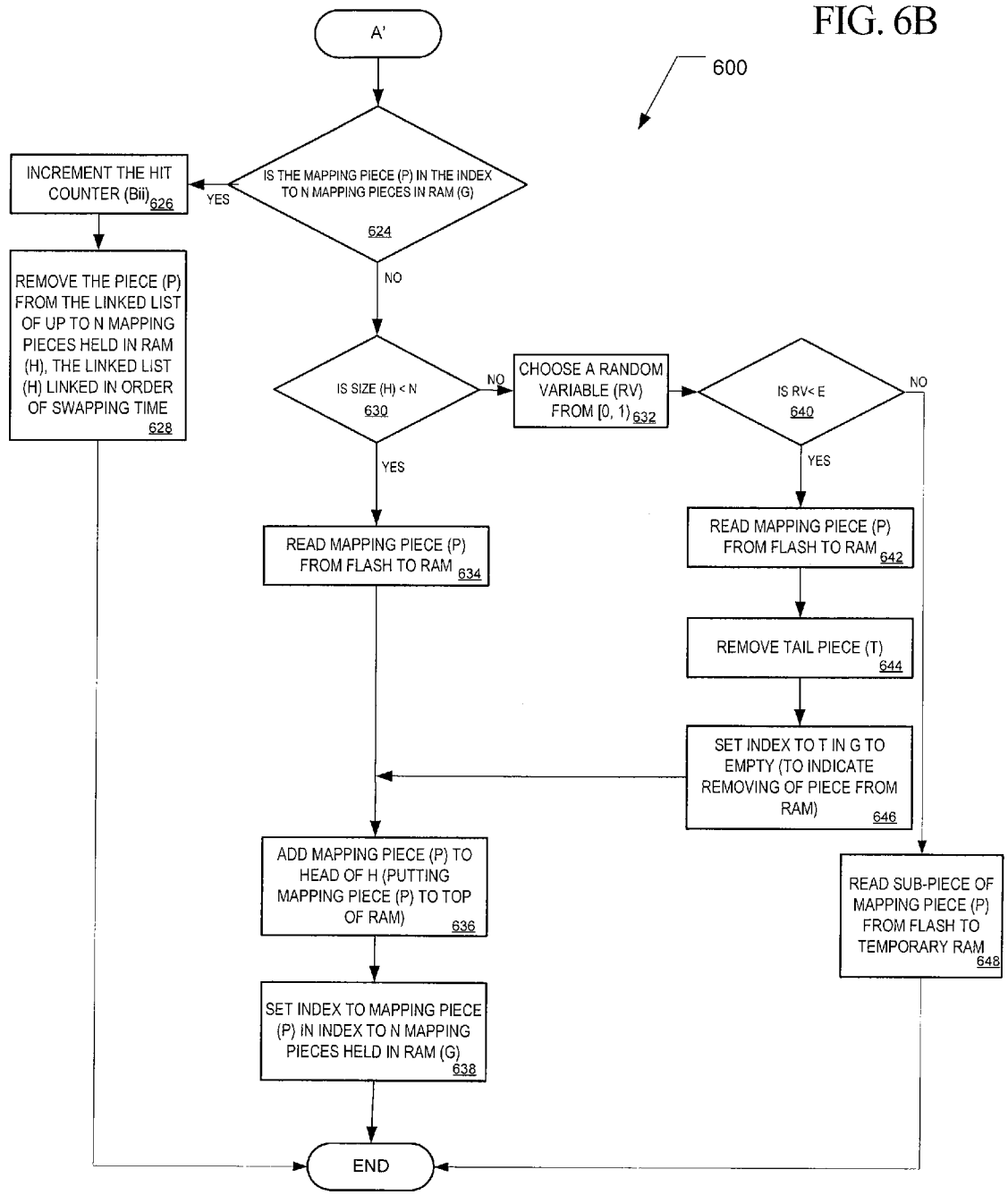

FIG. 6 is a more detailed flow chart 600 of the method disclosed in FIG. 5. At 602, an address table request is received. At 604, the stream associated with the address table request is identified. For example, the address table request may be analyzed to determine whether it is for a read, a write, or an internal copy. At 606, the piece (P) associated with the address table request is determined.

At 610, it is determined whether the request counter (Bi) is equal to the stream assessment threshold (C). Reasonably assessing the stream for one or more characteristics may necessitate a certain number of requests. The stream assessment threshold (C) may be set to a predetermined number that provides a reasonable assessment of the stream (such as a reasonable number to perform a randomness assessment of the stream).

If there are a sufficient number of requests, the stream is analyzed to determine whether it is random. At 612, the following is determined:

$$ABS(Bii/Bi - N/M) \leq D$$

where Bi is the request counter;
Bii is the hit rate counter (the number of hits for all of the N pieces in RAM); and
D is stream random window size.

Bii/Bi is indicative of a percentage of hits (e.g., 72 hits for 100 requests=72%) and N/M is indicative of a percentage of the number of pieces stored in RAM (e.g., 7 pieces out of 10 total pieces=70%). If the absolute value of (Bii/Bi−N/M) is within the stream random window size (D), then the stream is characterized as random, with the characteristic set to random at 612, and the hit rate threshold (E) is set to the random hit rate threshold (Ei) at 614. If the absolute value of (Bii/Bi−N/M) is outside of the stream random window size (D), then the stream is characterized as non-random, with the characteristic set to non-random at 616, and the hit rate threshold (E) is set to the non-random hit rate threshold (Eii) at 618. At 620, the request counter (Bi) and the hit rate counter (Bii) are then set to zero. Alternatively, the request counter (Bi) and the hit rate counter (Bii) may be reset after a predetermined amount of time. The request counter (Bi) is then incremented at 622. In this way, the analysis can iterate and re-determine the characteristic of the stream.

At 624, it is determined whether the piece (P) is in the index (G) to mapping pieces in RAM. In other words, it is determined whether the piece (P) associated with the address table request is stored in RAM. If so, at 626, the hit counter (Bii) is incremented. Moreover, at 628, the piece (P) is removed from the linked list (H) of up to N pieces held in RAM. The linked list (H) is linked in order of swapping time.

If the piece (P) is not stored in RAM, it is determined whether to add a piece to (or swap a piece from) RAM. At 630, it is determined whether the linked list (H) is less than N. If so, the RAM has stored therein less than N pieces of the address mapping table. So that, at 634, piece (P) is copied from flash to RAM. If not, the RAM already has N pieces stored therein, and a determination whether to swap a piece is made. In order to make the determination whether to swap a piece, at 632, a random variable (RV) is chosen (such as an RV from 0, 1)). At 640, the random number (RV) is compared with the stream hit rate threshold (E). As discussed above, the stream hit rate threshold (E) is set to a random hit rate threshold (Ei) if the stream is determined to be random and is set to a non-random hit rate threshold (Eii) if the stream is determined to be non-random. The value of Eii may be ~0.1, and the value of Ei may be an order of magnitude lower (such as ~0.01). The values provided are merely for illustration purposes to show that a finding of randomness of the stream results in lower likelihood of swapping pieces than a finding of non-randomness. The thresholds are compared with a random value selected between 0 and 1. Thus, the thresholds selected reflect that a stream determined to be random will be less likely to result in a swap, whereas a stream determined to be non-random will be more likely to result in a swap. So that, if RV<E, then a swap occurs and address mapping piece (P) is read from flash into RAM at 642. Further, one of the N pieces is removed RAM. For example, the tail piece (T) is removed from RAM. The tail piece (T) may be selected in one of several ways, such as the least recently used (LRU) piece, or the least frequently used (LFU) piece. At 646, the index to the tail piece (T) in G is set to empty to indicate that the tail piece (T) has been removed from RAM. At 636, the mapping piece (P) is added to the head of the linked list (H) to put the mapping piece (P) at the top of RAM. At 638, set the index (G) to the mapping piece (P) to indicate that the mapping piece (P) is now stored in RAM. In this way, the system and method may more efficiently swap pieces to/from DRAM by using a simple stream state determination, such as either random or non-random, coupled with a random number generator to cause swaps based on different decision thresholds for the two possible stream states.

If RV≥E, at 648, no swapping occurs and a sub-piece of mapping piece (P) is read from flash into temporary location (such as temporary DRAM) from where the requested information (such as address mappings) are extracted. In one embodiment, once the information from the sub-piece is extracted, there is no use for the sub-piece (and the copy in the temporary location is no longer used). As discussed above, by definition, the sub-piece size is too small to be indexed efficiently.

In an alternate embodiment, the sub-piece may be accessed one or more times in the temporary location in memory. For example, a small number of sub-pieces may be stored in a predetermined location in DRAM (such as defined DRAM region). The defined DRAM region need not be too large because the sub-piece size is too small to have an efficient indexing search. Moreover, a sub-piece list or sub-piece index (or other data construct to index to the sub-pieces stored in DRAM) may be used to access the sub-pieces stored in DRAM. The sub-piece list may be arranged in one or more ways, such as least recently used (LRU) or least frequently used (LFU). Moreover, the sub-piece list may be short (such as shorter than the number "M" pieces of the address mapping table; e.g., length of sub-piece list=1 sub-piece entry).

By definition, the sub-piece is unmanageable since the index size would be too large to index all of the sub-pieces in the address mapping table. Rather, the sub-piece list may include an entry for less than all of the available sub-pieces (such as only 10 sub-pieces). Searching of the sub-piece list may rely on a linear search of a LRU sub-piece. Further, one or more sub-pieces on the sub-piece list may be discarded as soon as the one or more sub-pieces become least recently used piece in the predetermined location in DRAM. So that, each incoming request for access to the address mapping table may first access the sub-piece list to determine if the sub-piece is already stored in DRAM (thus avoiding re-reading the sub-piece from flash memory). In this way, there may be two different types divisions of the address mapping table being stored in DRAM, such as pieces of the address mapping table and sub-pieces of the address mapping table, with the sub-pieces being smaller in size than the pieces.

It is therefore intended that the foregoing detailed description be regarded as illustrative rather than limiting, and that it be understood that it is the following claims, including all equivalents, that are intended to define the spirit and scope of this invention.

What is claimed is:

1. In a processor, a method for managing which pieces of a mapping table to store in a volatile memory of a storage device, the method comprising:
   receiving a stream of internal requests for accesses to the mapping table;
   determining a hit rate indicative of a number of times in which the stream of internal requests uses at least a part of the mapping table;
   determining, based on the hit rate, randomness of the stream of internal requests; and
   determining whether to copy a piece of the mapping table stored in non-volatile memory into the volatile memory based on the randomness,
   wherein the stream of internal requests is indicative of internal movement of data within the storage device.

2. The method of claim 1, wherein the stream of internal requests access different pieces of the mapping table; and
   wherein determining the hit rate is across the different pieces in the mapping table.

3. The method of claim 2, wherein the mapping table is divided into M pieces;
   wherein N pieces of the mapping table are stored in the volatile memory, with N<M; and
   wherein the hit rate is indicative of a number of times in which the stream of internal requests uses any one of a plurality of the N pieces of the mapping table stored in the volatile memory.

4. The method of claim 1, wherein determining whether to copy a piece of the mapping table stored in non-volatile memory into the volatile memory based on the randomness comprises:
   determining not to copy a piece of the mapping table in response to determining that the stream of internal requests is random; and
   determining to copy a piece of the mapping table in response to determining that the stream of internal requests is not random.

5. In a processor, a method for managing which pieces of a mapping table to store in a volatile memory of a storage device, the method comprising:
   receiving a stream of internal requests for accesses to the mapping table;
   determining a total hit rate indicative of a number of times in which the stream of internal requests uses any one of N pieces of the mapping table stored in the volatile memory;
   analyzing the total hit rate across all of the N pieces of the mapping table stored in the volatile memory in order to determine at least one characteristic of the stream of internal requests; and
   determining whether to copy a piece of the mapping table stored in non-volatile memory into the volatile memory based on the at least one characteristic,
   wherein the stream of internal requests is indicative of internal movement of data within the storage device.

6. The method of claim 5, wherein the at least one characteristic comprises randomness of the stream of internal requests.

7. The method of claim 6, wherein determining whether to copy a piece of the mapping table stored in the non-volatile memory into the volatile memory based on the determined characteristic comprises:
   making it less likely to copy the piece of the mapping table stored in the non-volatile memory into the volatile memory if the stream of internal requests is random than if the stream of internal requests is non-random.

8. The method of claim 5, further comprising:
   determining which stream, from a plurality of different streams, the request is associated with;
   determining if the number of requests in the determined stream is at least a predetermined amount in order to analyze for the at least one characteristic; and
   if it is determined that the number of requests in the determined stream is at least the predetermined amount, analyzing the requests in the determined stream for the at least one characteristic.

9. The method of claim 8, wherein the mapping table is divided into M pieces;
wherein N<M;
wherein analyzing the requests of the determined stream comprises:
comparing the total hit rate/the number of requests in the determined stream to the N/M;
if the comparison of the total hit rate/the number of requests in the determined stream to the N/M is within a predetermined window, determining that the requests in the determined stream is random;
if the comparison of the total hit rate/the number of requests in the determined stream to the N/M is outside of the predetermined window, determining that the requests in the determined stream is not random.

10. The method of claim 9, wherein determining whether to copy a piece of the mapping table stored in non-volatile memory into the volatile memory based on the determined characteristic comprises:
identifying which piece of the mapping table is associated with the request;
if the identified piece of the mapping table associated with the request is not stored in volatile memory:
generating a random number;
comparing the random number with a randomness threshold, the randomness threshold dependent on whether the determined stream is random or not random;
if the random number is less than or equal to the randomness threshold, swapping one of the N pieces with the identified piece of the mapping table; and
if the random number is more than the randomness threshold, copying only a sub-piece of the identified piece into volatile memory.

11. A storage device comprising:
a non-volatile memory configured to store a mapping table;
a volatile memory; and
a controller in communication with the non-volatile memory and the volatile memory, the controller configured to:
receive a stream of internal requests for accesses to the mapping table;
determine a hit rate indicative of a number of times in which the stream of internal requests uses at least a part of the mapping table;
determine, based on the hit rate, randomness of the stream of internal requests; and
determine whether to copy a piece of the mapping table stored in non-volatile memory into the volatile memory based on the determined randomness.

12. The storage device of claim 11, wherein the stream of internal requests access different pieces of the mapping table; and
wherein the controller is configured to determine the hit rate across the different pieces in the mapping table.

13. The storage device of claim 12, wherein the mapping table is divided into M pieces;
wherein N pieces of the mapping table are stored in the volatile memory, with N<M; and
wherein the hit rate is indicative of a number of times in which the stream of internal requests uses any one of a plurality of the N pieces of the mapping table stored in the volatile memory.

14. The storage device of claim 11, wherein the controller is configured to determine whether to copy a piece of the mapping table stored in non-volatile memory into the volatile memory based on the randomness by:
determining not to copy a piece of the mapping table in response to determining that the stream of internal requests is random; and
determining to copy a piece of the mapping table in response to determining that the stream of internal requests is not random.

15. A storage device comprising:
a non-volatile memory configured to store a mapping table;
a volatile memory; and
a controller in communication with the non-volatile memory and the volatile memory, the controller configured to:
receive a stream of internal requests for accesses to the mapping table;
determine a total hit rate indicative of a number of times in which the stream of internal requests uses any one of N pieces of the mapping table stored in the volatile memory;
analyze the total hit rate across all of the N pieces of the mapping table stored in the volatile memory in order to determine at least one characteristic of the stream of internal requests; and
determine whether to copy a piece of the mapping table stored in non-volatile memory into the volatile memory based on the at least one characteristic,
wherein the stream of internal requests is indicative of internal movement of data within the storage device.

16. The storage device of claim 15, wherein the at least one characteristic comprises randomness of the stream of internal requests.

17. The storage device of claim 16, wherein the controller is configured to determine whether to copy a piece of the mapping table stored in the non-volatile memory into the volatile memory based on the determined characteristic by:
making it less likely to copy the piece of the mapping table stored in the non-volatile memory into the volatile memory if the stream of internal requests is random than if the stream of internal requests is non-random.

18. The storage device of claim 15, wherein the controller is further configured to:
determine which stream, from a plurality of different streams, the request is associated with;
determine if the number of requests in the determined stream is at least a predetermined amount in order to analyze for the at least one characteristic; and
if it is determined that the number of requests in the determined stream is at least the predetermined amount, analyze the requests in the determined stream for the at least one characteristic.

19. The storage device of claim 18, wherein the mapping table is divided into M pieces;
wherein N<M;
wherein the controller is configured to analyze the requests of the determined stream by:
comparing the total hit rate/the number of requests in the determined stream to the N/M;
if the comparison of the total hit rate/the number of requests in the determined stream to the N/M is within a predetermined window, determining that the requests in the determined stream is random;
if the comparison of the total hit rate/the number of requests in the determined stream to the N/M is outside of the predetermined window, determining that the requests in the determined stream is not random.

20. The storage device of claim 19, wherein the controller is configured to determine whether to copy a piece of the mapping table stored in non-volatile memory into the volatile memory based on the determined characteristic by:
- identifying which piece of the mapping table is associated with the request;
- if the identified piece of the mapping table associated with the request is not stored in volatile memory:
  - generating a random number;
  - comparing the random number with a randomness threshold, the randomness threshold dependent on whether the determined stream is random or not random;
  - if the random number is less than or equal to the randomness threshold, swapping one of the N pieces with the identified piece of the mapping table; and
  - if the random number is more than the randomness threshold, copying only a sub-piece of the identified piece into volatile memory.

* * * * *